(12) United States Patent
Gao et al.

(10) Patent No.: US 9,637,001 B2
(45) Date of Patent: May 2, 2017

(54) METHOD FOR DETERMINING VEHICLE WHEEL SPEED AND SLIP CONDITION PARAMETERS

(71) Applicant: e-AAM Driveline Systems AB, Trollhättan (SE)

(72) Inventors: Yunlong Gao, Trollhättan (SE); Matthijs Klomp, Trollhättan (SE)

(73) Assignee: e-AAM Driveline Systems AB, Trollhättan (SE)

( * ) Notice: Subject to any disclaimer, the term of this patent is extended or adjusted under 35 U.S.C. 154(b) by 0 days.

(21) Appl. No.: 14/924,745

(22) Filed: Oct. 28, 2015

(65) Prior Publication Data

US 2016/0046186 A1 Feb. 18, 2016

Related U.S. Application Data

(63) Continuation of application No. 14/294,535, filed on Jun. 3, 2014, now Pat. No. 9,174,534.

(Continued)

(51) Int. Cl.
*B60T 7/12* (2006.01)
*B60K 17/354* (2006.01)
(Continued)

(52) U.S. Cl.
CPC ............. *B60K 28/16* (2013.01); *B60T 8/172* (2013.01); *B60T 2250/04* (2013.01); *Y02T 10/84* (2013.01)

(58) Field of Classification Search
USPC ............................................ 701/90; 180/247
See application file for complete search history.

(56) References Cited

U.S. PATENT DOCUMENTS 5,132,908 A * 7/1992 Eto .................... B60K 23/0808
180/197
5,416,712 A 5/1995 Geier et al.
(Continued)

FOREIGN PATENT DOCUMENTS

DE 102007047337 5/2008
EP 1403654 A1 3/2004
EP 2187223 A1 5/2010

OTHER PUBLICATIONS

Jiang, Fangjun et al.; An Adaptive Nonlinear Filter Approach to the Vehicle Velocity Estimation for ABS; Proceedings of the 2000 IEEE International Conference on Control Applications, Sep. 25-27, 2000; 6 pages.

(Continued)

*Primary Examiner* — Tyler Paige
(74) *Attorney, Agent, or Firm* — Harness, Dickey & Pierce, P.L.C.

(57) ABSTRACT

A method is described for estimating longitudinal velocity of a vehicle on a road surface. The method includes obtaining a measured value of vehicle acceleration, which is dependent on longitudinal acceleration of the vehicle and vertical acceleration of the vehicle when a slope of the road surface is non-zero. The method includes determining an initial estimate of the slope. The method includes determining a difference between the initial estimate of the slope and a prior estimate of the slope and, based on the difference, setting a current estimate of the slope to be equal to the initial estimate or the prior estimate. The method includes estimating the longitudinal velocity of the vehicle based on the current estimate of the slope and the measured value of vehicle acceleration. The method includes controlling at least one wheel of the plurality of wheels based on the estimated longitudinal velocity of the vehicle.

4 Claims, 7 Drawing Sheets

Related U.S. Application Data

(60) Provisional application No. 61/936,558, filed on Feb. 6, 2014, provisional application No. 61/830,368, filed on Jun. 3, 2013.

(51) Int. Cl.
*B60K 28/16* (2006.01)
*B60T 8/172* (2006.01)

(56) References Cited

U.S. PATENT DOCUMENTS

| | | | |
|---|---|---|---|
| 6,295,500 B1* | 9/2001 | Cullen | B60K 6/48 180/170 |
| 6,976,553 B1* | 12/2005 | Dahl | B60K 23/04 180/233 |
| 8,370,013 B2 | 2/2013 | Linda et al. | |
| 8,663,051 B2 | 3/2014 | Sten | |
| 2003/0151381 A1* | 8/2003 | Kadota | B60W 20/15 318/465 |
| 2005/0109549 A1* | 5/2005 | Morrow | B60K 6/387 180/65.245 |
| 2008/0227598 A1* | 9/2008 | Sigmund | B60W 10/06 477/92 |
| 2009/0255746 A1* | 10/2009 | Boesch | B60K 6/365 180/197 |
| 2009/0265043 A1 | 10/2009 | Merrow et al. | |
| 2010/0256887 A1* | 10/2010 | Linda | B60L 3/10 701/82 |
| 2011/0218715 A1* | 9/2011 | Duraiswamy | B60K 17/36 701/51 |
| 2013/0131942 A1* | 5/2013 | Duraiswamy | F16D 43/284 701/67 |
| 2013/0297189 A1* | 11/2013 | Cornils | B60T 8/172 701/110 |
| 2014/0046532 A1* | 2/2014 | Saito | B60T 8/885 701/30.4 |
| 2014/0297119 A1 | 10/2014 | Giovanardi et al. | |
| 2014/0358340 A1* | 12/2014 | Radev | B60K 6/442 701/22 |
| 2014/0358397 A1 | 12/2014 | Gao et al. | |
| 2016/0046186 A1* | 2/2016 | Gao | B60K 28/16 701/90 |

OTHER PUBLICATIONS

Imsland, Lars et al.; Nonlinear Observer for Vehicle Velocity Estimation; 2006-01-1282; Copyright © 2009 SAE International; 10 pages.

Gao, Yunlong; Longitudinal Velocity and Road Slope Estimation in Hybrid/Electric Vehicles, Development and Evaluation of an Adaptive Kalman Filter; Master's Thesis in the International Master's Program; Chalmers University of Technology; ISSN 1652-8557; 2013; 59 pages.

Song, Chul Ki et al.; Vehicle Speed Estimation Using Accelerometer and Wheel Speed Measurements; SAE Technical Paper Series; 2001-01-2229; Reprinted from: Proceedings of the 2002 SAE International Body Engineering Conference and Automotive & Transportation Technology Conference on CD-ROM (IBAT2002CD); ISSN 0148-7191; Copyright © 2002 Society of Automotive Engineers, Inc.; Jul. 9-11, 2002; 10 pages.

Tanelli, Mara et al,; Longitudinal Vehicle Speed Estimation for Traction and Braking Control Systems; Proceedings of the 2006 IEEE International Conference on Control Applications; Copyright © 2006 IEEE; Oct. 4-6, 2006; 6 pages.

Daib, A. et al.; Estimation of Vehicle Speed Fuzzy-Estimation in Comparison with Kalman-Filtering; Copyright © 1995 IEEE; 4 pages.

Kobayashi, Kazuyuki et al.; Estimation of Absolute Vehicle Speed using Fuzzy Logic Rule-Based Kalman Filter; Proceedings of the American Control Conference; Jun. 1995; 5 pages.

Lu, Xiong et al.; Vehicle Longitudinal Velocity Estimation with Adaptive Kalman Filter; Clean Energy Automotive Engineering Center; Tongji University; AVEC 2012; 6 pages.

Guofu, Liu et al.; Sensor Fusion Based Estimation Technology of Vehicle Velocity in ABS System (Abstract); Department of Mechatronics and Instrumentation; National University of Defense Technology; Aug. 2004; 3 pages.

Zhiquan, Qi et al.; Determination of Vehicle Reference Speed for ABS Based on an ABS/ASR/ACC Integrated System (Abstract); Beijing Institute of Technology; National Lab of Auto Performance and Emission Test; Automotive Engineering, vol. 25, No. 6; Jun. 25, 2003; 4 pages.

International Search Report and Written Opinion for related PCT Application No. PCT/IB2014/061927, mailed Sep. 18, 2014.

\* cited by examiner

METHOD FOR DETERMINING VEHICLE WHEEL SPEED AND SLIP CONDITION PARAMETERS

CROSS-REFERENCE TO RELATED APPLICATIONS

This application is a continuation of U.S. Ser. No. 14/294,535 filed Jun. 3, 1014, which claims the benefit of U.S. Provisional Application No. 61/830,368 filed Jun. 3, 2013 and U.S. Provisional Application No. 61/936,558 filed Feb. 6, 2014. The entire disclosure of each of the above-referenced applications is hereby incorporated by reference as if fully set forth in detail herein.

FIELD

The present disclosure relates to a system and method for determining a vehicle velocity parameter.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Modern vehicle dynamic control systems, such as traction control systems (TCS), anti-lock braking systems (ABS), and electronic stabilization programs (ESP), have improved the safety of vehicles. The performance of these dynamic control systems is reliant to some degree on the accuracy of various vehicle parameters, such as the vehicle velocity, which are often estimated or determined based on input from one or more vehicle sensors.

The determination of vehicle velocity has been the subject of various papers and patent applications. Direct measurement of the longitudinal vehicle velocity may be too expensive and/or impractical for vehicle applications. Typical methods for determining vehicle velocity therefore fall into two groups: a first group that uses wheel speed and vehicle body acceleration to directly determine vehicle velocity; and a second group that estimates vehicle velocity based on a vehicle model to indirectly determine vehicle velocity.

With regard to methodologies falling into the first group, it is known to use maximum wheel speed for velocity estimation when the vehicle is braking and to use the minimum wheel speed when the vehicle is in a "traction mode". Such practices are known as "best wheel methods" and can be employed to very rapidly determine the vehicle velocity. One drawback to the "best wheel methods" concerns the noise that may be present in the measurement of wheel speed. The accuracy with which the vehicle velocity is determined will vary based on the level of noise in the wheel speed signals.

Another methodology falling into the first group involves the identification of a reliable wheel speed, checking the vehicle body acceleration, and using a weighted average of the wheel speed and the integration of the vehicle body acceleration to obtain an estimate of the vehicle velocity. The accuracy of this method is dependent to some degree on the bias of the accelerometer that senses vehicle body acceleration and on the wheel radius measurement. Time integration of the longitudinal acceleration accumulates sensor bias, causing the estimation to drift. Another source of error is the gravitational component of acceleration acting in the direction of the road slope, distorting the acceleration measurement.

Additionally, the impact on vehicle velocity of accelerometer bias and wheel radius variation can change in different driving scenarios. Proposed solutions employ a weighted average method that uses feedback from the accelerometer bias and wheel radius offset, or data obtained through analysis of global positioning system (GPS) signals. The accuracy with which such methodologies determine vehicle velocity will vary based on noise associated with the derivative of wheel speed. A Kalman filter may be employed to determine the weighted average, but is not thought to be practical because the calculation is relatively complex and slow.

With regard to methodologies falling within the second group, a kinematic model can be used to estimate vehicle velocity using inputs of vehicle body acceleration and the rotational speed of the vehicle's four wheels. While this method can perform well in some situations, the results tend to be sensitive to signal noise and the location of the sensors.

Another methodology falling within the second group uses a tire model that provides a tire force estimation. While such methodologies are typically less sensitive (or even insensitive) to noise, the methodology includes a "non-linear situation" in which estimation error may be undesirably large.

While velocity estimation relies on wheel speeds, in some driving scenarios the wheel speed measurements of some wheels are not reliable, such as when a wheel is slipping with respect to the road surface. An adaptive Kalman filter has been used in an attempt to solve the slipping-wheel problem. However, in challenging conditions, such as when all four wheels are slipping, the adaptive Kalman filter may not provide satisfactory results.

In conclusion, each approach has drawbacks. Using wheel speed, error accrues due to slipping wheels, wheel radius variation, and offset of wheels from the vehicle's center of gravity. Integration of acceleration data is problematic if the initial velocity value is imprecise, and errors accumulate due to accelerometer bias and non-zero road slope. Vehicle/tire models are subject to modeling error, especially for non-linear models. Accordingly, there remains a need in the art to more accurately and reliably determine vehicle velocity.

SUMMARY

A method is described for estimating longitudinal velocity of a vehicle that is operating on a longitudinally-extending road surface. The vehicle has a plurality of wheels including a first set of wheels and a second set of wheels. The first set of wheels is spaced apart from the second set of wheels along a longitudinal axis of the vehicle. The longitudinal velocity of the vehicle is parallel to the longitudinal axis of the vehicle. The road surface has a slope that is associated with changes in elevation of the road surface as the vehicle travels along the road surface.

The method includes obtaining a measured value of vehicle acceleration. The measured value of vehicle acceleration is based on (i) longitudinal acceleration of the vehicle and (ii) vertical acceleration of the vehicle when the slope of the road surface is non-zero. The longitudinal acceleration of the vehicle is acceleration of the vehicle in a direction parallel to the longitudinal axis of the vehicle. The method includes determining an initial estimate of the slope of the road surface. The method includes determining a difference between the initial estimate of the slope of the road surface and a prior estimate of the slope of the road surface.

The method includes, based on a magnitude of the difference, setting a current estimate of the slope of the road surface to be equal to one of (i) the initial estimate of the slope of the road surface and (ii) a value based on the prior estimate of the slope of the road surface. The method includes estimating the longitudinal velocity of the vehicle based on (i) the current estimate of the slope of the road surface and (ii) the measured value of vehicle acceleration. The method includes controlling at least one wheel of the plurality of wheels based on the estimated longitudinal velocity of the vehicle.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

Figure 1:
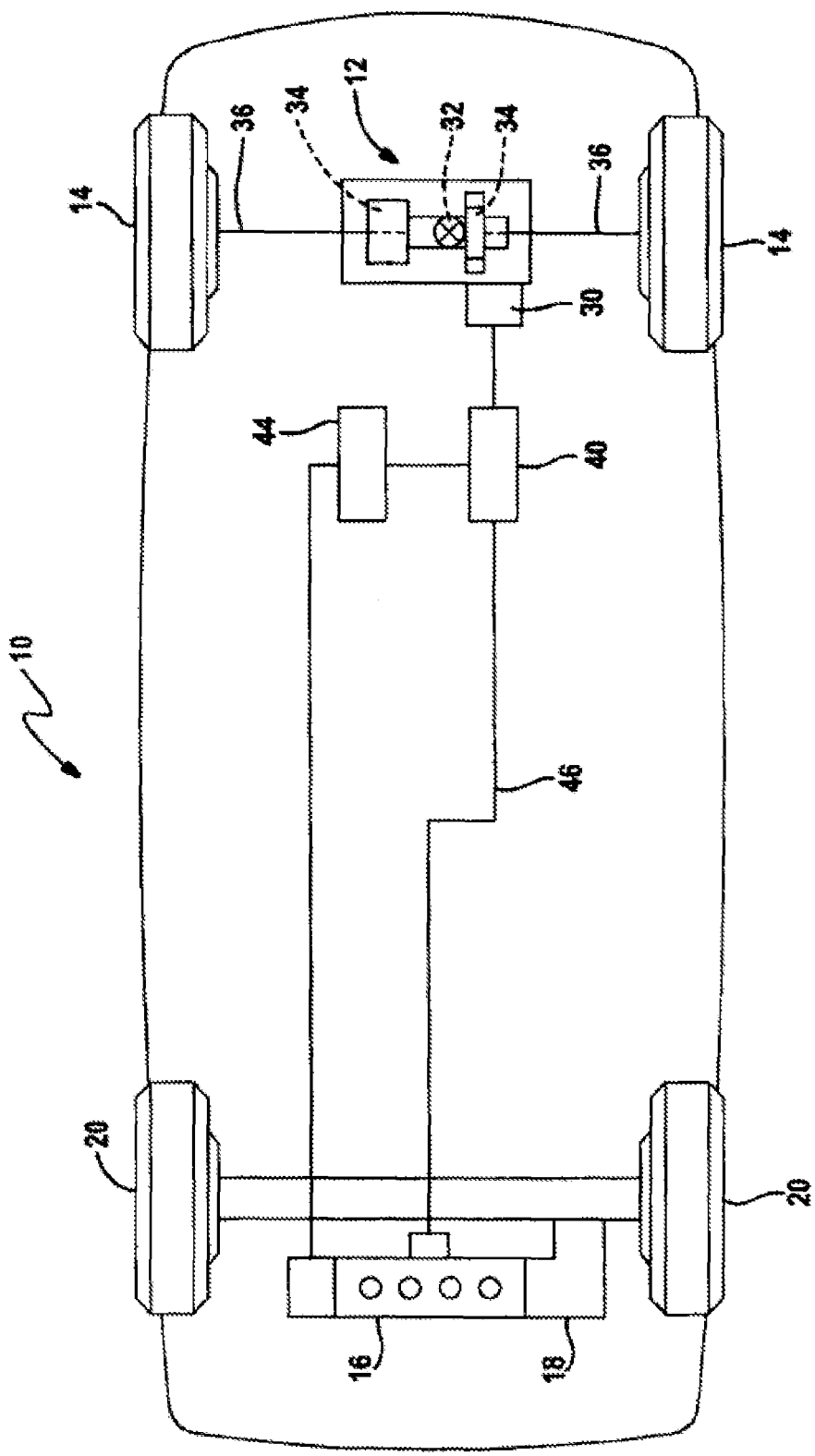
FIG. 1 is a schematic illustration of an example vehicle having an electric drive system and controller constructed according to the principles of the present disclosure.

In FIG. 1, an example vehicle 10 includes an electric drive system 12 that is constructed in accordance with the teachings of the present disclosure. The electric drive system 12 selectively drives a pair of rear vehicle wheels 14. The electric drive system 12 may be part of a secondary driveline that is operated on a part-time basis, while a conventional internal combustion engine 16 and transmission 18 are employed to drive a pair of front vehicle wheels 20 on a full-time basis.

In various other implementations, the electric drive system 12 may instead selectively drive the pair of front vehicle wheels 20, while the internal combustion engine 16 drives the pair of rear vehicle wheels 14. In other implementations, the electric drive system 12 may drive both the pair of front vehicle wheels 20 and the pair of rear vehicle wheels 14. In still other implementations, the electric drive system 12 may drive the pair of front vehicle wheels 20 while another electric drive system (which may be similar or identical to the electric drive system 12) may drive the pair of rear vehicle wheels 14. Still other drivetrains can be accommodated by the teachings of the present disclosure.

Further, the teachings of the present disclosure may be used to control the vehicle even when there is no electric drive mechanism. For example, an accurate estimate of instantaneous vehicle velocity may allow for refinements of one or more of a traction control system (TCS), an anti-lock braking system (ABS), an electronic stabilization program (ESP), an active collision avoidance system, and an adaptive cruise control system.

The electric drive system 12 can be configured as described in commonly-owned U.S. Pat. No. 8,663,051, issued Mar. 4, 2014, the entire disclosure of which is hereby incorporated by reference. Briefly, the electric drive system 12 of FIG. 1 includes an electric propulsion motor 30 that drives a differential assembly 32. A pair of output members 34 is at least partly driven by the differential assembly 32 and drives corresponding axle shafts 36 to thereby drive the rear vehicle wheels 14.

The electric drive system 12 can further include a controller 40 that can be configured to control operation of the electric drive system 12. The controller 40 can be coupled to the propulsion motor 30, a source of electricity (e.g., batteries 44), and a vehicle data network 46. The vehicle data network 46 can be any type of system or network for transmitting vehicle data within the vehicle 10, such as a controller area network (CAN) or a local interconnect network (LIN). The batteries 44 can include any type of battery and can be recharged, for example, via an alternator, a generator, and/or regenerative braking.

The controller 40 can receive data from the vehicle data network 46 that pertains to: a) present vehicle dynamics, including the speed of the vehicle 10; b) the surface (e.g., road surface) on which the vehicle 10 is operating; c) driver input to control the vehicle 10; and d) the environment in which the vehicle 10 is operating. The controller 40 can employ the data received from the vehicle data network 46 to control the operation of the electric drive system 12 to thereby regulate the torque that is transmitted to the rear vehicle wheels 14.

For example, the controller 40 can be operated in a preemptive all-wheel drive mode in which the electric drive system 12 is operated to preemptively apply torque to the rear vehicle wheels 14 to prevent slippage of the front vehicle wheels 20. Operation of the controller 40 in the preemptive mode may be particularly advantageous in situations where the vehicle 10 will need to accelerate from an almost still or zero velocity condition or accelerate when the vehicle 10 is operated in certain situations, such as low friction surfaces, soft surfaces, or steep road slopes.

When driving the rear vehicle wheels 14, maximum traction (and therefore optimal performance) is achieved when the speed at which the rear vehicle wheels 14 are driven corresponds to the longitudinal speed of the vehicle 10. In various circumstances, such as when the front vehicle wheels 20 are slipping, the vehicle speed will not be directly proportional to the speed of the front vehicle wheels 20. Therefore, accurately determining the actual vehicle speed can improve the control of the electric drive system 12.

Figure 2:
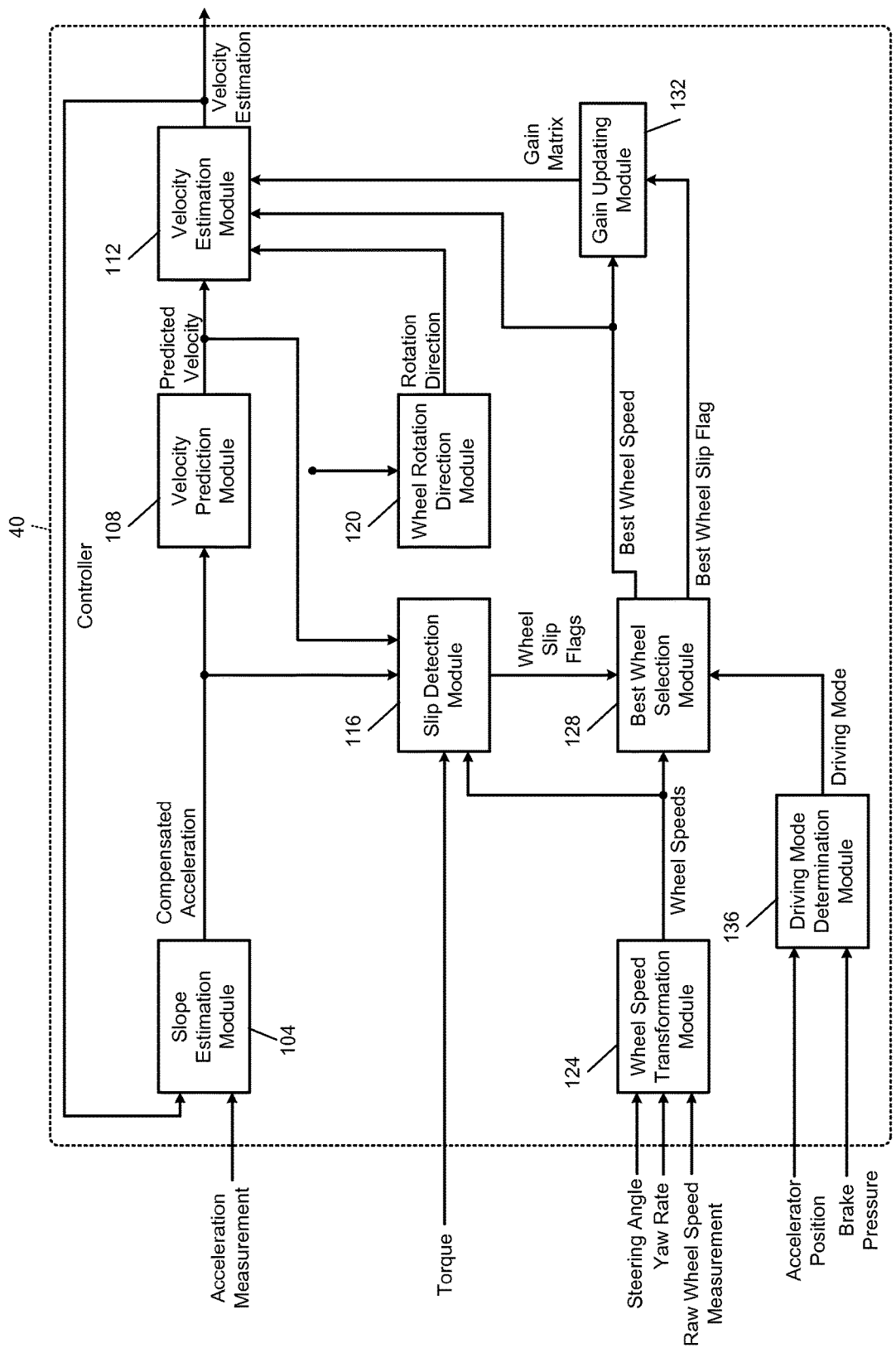
FIG. 2 is a functional block diagram of an example implementation of a controller according to the principles of the present disclosure.

In FIG. 2, an example implementation of the controller 40 includes a slope estimation module 104 that receives acceleration measurements, such as from an accelerometer. The slope estimation module 104 estimates the slope of the surface on which the vehicle is traveling with respect to a flat surface (i.e., a surface that is normal to the gravity vector). The slope estimation module 104 also receives an estimation of the vehicle's longitudinal velocity for use in estimating the slope. The slope estimation module 104 then compensates the measured acceleration to produce a compensated acceleration corresponding to longitudinal acceleration of the vehicle and excluding contributions to the acceleration measurement from gravity.

Figure 3A:
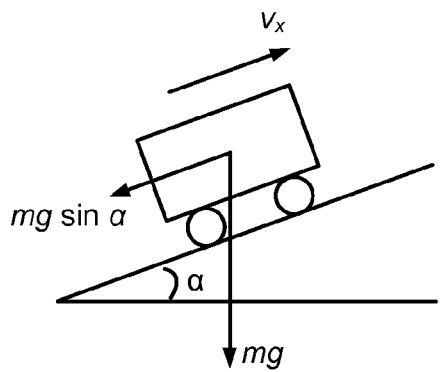
FIG. 3A is a free body diagram of a vehicle on a surface having a non-zero slope.

In general, the acceleration measurement includes a forward movement component, a gravitational component, and a lateral motion component. As partly shown in a free body diagram in FIG. 3A, the measurement of a vehicle accelerometer can be written as $$a_x = \dot{v}_x + v_y \dot{\psi} + g \sin \alpha$$

where $a_x$ is accelerometer measurement, $\dot{v}_x$ is slope-compensated longitudinal acceleration, g is gravity acceleration and $\alpha$ is road slope angle. Further, $v_y \dot{\psi}$ is the product of lateral velocity, $v_y$, and yaw rate, $\dot{\psi}$. In various implementations, the lateral velocity may be assumed to be negligible.

A general discrete system Kalman filter can be expressed by the following series of equations:

$$\hat{x}_{k|k-1} = \Phi_{k|k-1} \hat{x}_{k-1|k-1} + \Psi_{k-1} u_k$$

$$P_{k|k-1} = \Phi_{k|k-1} P_{k-1|k-1} \Phi_{k|k-1}^T + Q_{k|k-1}$$

$$K_k = P_{k|k-1} H_k^T (H_k P_{k|k-1} H_k^T + R_{k|k-1})^{-1}$$

$$\hat{x}_{k|k} = \hat{x}_{k|k-1} + K_k(z_k - H_k \hat{x}_{k|k-1})$$

$$P_{k|k} = (I - K_k H_k) P_{k|k-1}$$

where $\hat{x}_{k|k}$ is the post-measurement update estimation states vector at the discrete time step k, $\hat{x}_{k|k-1}$ is the pre-estimation (prediction) of the states at step k, u is the inputs vector, and z is the observation variables (measurements) vector. Moreover, P, Q, and R represent, respectively, the estimation error, system error, and measurement error covariance matrices. Finally, $H_k$ the observation matrix, $K_k$ is the Kalman filter gain matrix, and $\Phi$ and $\Psi$ are, respectively, the system matrix and input matrices.

Choosing $v_x$ and $\sin \alpha$ as state variables, $a_x$ as the input variable, and $\hat{v}_x$ as the observation variable results in:

$$x = [v_x \ \sin \alpha]^T, u = a_x, z = \hat{v}_x$$

where $v_x$ and $\hat{v}_x$ are the vehicle velocity and its estimation result, respectively.

The state equation can then be written as $$\dot{x} = \begin{bmatrix} 0 & -g \\ 0 & 0 \end{bmatrix} x + \begin{bmatrix} 1 \\ 0 \end{bmatrix} u$$

Discretizing the state function and substituting the following into the Kalman filter series of equations allows the road slope to be estimated using a Kalman filter:

$$\Phi_\alpha = \begin{bmatrix} 1 & -\tau g \\ 0 & 1 \end{bmatrix}, \Psi_\alpha = \begin{bmatrix} 1 \\ 0 \end{bmatrix}, H_\alpha = [1 \ 0]$$

The prediction and measurement covariance matrices are chosen as:

$$Q_\alpha = \begin{bmatrix} 10 & 0 \\ 0 & 0.1 \end{bmatrix}, R_\alpha = 200$$

The observation variable of the slope estimation algorithm is the output of velocity estimation, and the result of slope estimation is used to fix the accelerometer measurement. Then these two algorithms are combined together.

When there is excessive wheel slip simultaneously on all four wheels on a sloped road, both the wheel speeds and the acceleration may be unreliable, leading to errors in velocity prediction and slope estimation. In order to solve this problem, an assumption can be made that the road slope does not change rapidly. Therefore, a gradient limit ($\Delta \alpha$) on the slope estimation is set. If the slope estimation does not meet with the following criterion:

$$|\alpha(k) - \alpha(k-1)| < \Delta \alpha,$$

the slope estimation result output by the slope estimation module 104 is maintained at the value obtained from the previous iteration.

A velocity prediction module 108 generates a predicted velocity based on the compensated acceleration. The predicted velocity is received by a velocity estimation module 112, a slip detection module 116, and a wheel rotation direction module 120. The velocity estimation module 112 receives further inputs, described below, and estimates a longitudinal velocity of the vehicle.

The velocity estimation module 112 may also use a Kalman filter, as described by the series of equations above. The following parameters can be chosen for purposes of velocity estimation:

$$\hat{x}_v = \hat{v}_x, u_v = \dot{v}_x, z_v = v_{x,BstW}$$

where $\hat{v}_x$ is the estimated longitudinal velocity, $\dot{v}_x$ is the slope-compensated longitudinal acceleration and $v_{x,BstW}$ is the measured velocity based on the selected best-wheel speed (described in more detail below).

Further, the following parameters are chosen as an example:

$$\Phi_v = 1, \Psi_v = \tau, H_v = 1, Q_v = 1, R_v = 200$$

where $\tau$ is the sample time of the filter. These gains may serve as tuning variables and may need to be calibrated depending on the application.

The Kalman filter gain matrix K may be controlled based on detection of excessive wheel slip. When excessive slip of the best wheel is detected (described below), the control gain matrix K can be set to zero, implying dead reckoning of the longitudinal acceleration. When there is no excessive slip at the best wheel, K is updated as in a typical Kalman filter.

The slip detection module 116, as described in more detail below, determines whether each of the wheels of the vehicle is slipping with respect to the road surface, and generates a corresponding flag for each wheel.

In various implementations, measured wheel speeds are unsigned values, meaning that whether the wheel is rotating in a forward direction or in a reverse direction is not directly measured. As a result, the wheel rotation direction module 120 determines a rotation direction of the wheels.

A wheel speed transformation module 124 receives raw wheel speed measurements from each wheel, and normalizes (e.g., transposes) each of the wheel speeds to a single location on the vehicle, such as the center of gravity. The wheel speed transformation module 124 therefore receives the steering angle and yaw rate of the vehicle.

Using the front left wheel as an example (the other three wheels are treated analogously), by linear transformation the longitudinal velocity in the wheel coordinates is:

$$v_{fl} = (v_x - s_f \dot{\psi}) \cos \delta + (v_y + l_f \dot{\psi}) \sin \delta$$

where $s_f$ is half the front track width, $l_f$ is the distance between front axle and gravity center, and $\delta$ is the steered angle of the wheel. By definition:

$$v_y, v_x \cos \beta$$

where $\beta$ is vehicle side slip angle. Therefore, the resulting transformation is:

$$v_x = \frac{v_{fl} + (s_f\cos\delta - l_f\sin\delta)\dot{\psi}}{\cos\delta + \tan\beta\sin\delta} = v_{fl}\sec\delta + (s_f - l_f\tan\delta)\dot{\psi}$$

when assuming that $\beta=0$, which may be reasonably accurate assumption in many driving scenarios.

The resulting wheel speeds are provided to the slip detection module 116 and a best wheel selection module 128. The best wheel selection module 128 selects one of the wheels as being the most representative of true vehicle velocity and outputs the wheel speed corresponding to that selected wheel. In various implementations, the selected wheel may not be a physical wheel of the vehicle, but may be a virtual wheel created by, for example, averaging together the wheel speeds of two or more of the wheels.

The best wheel selection module 128 receives the wheel slip flags from the slip detection module 116 and outputs the wheel slip flag corresponding to the best wheel. A gain updating module 132 adjusts a gain matrix provided to the velocity estimation module 112 based on the best wheel speed and the best wheel slip flag. For example, when the best wheel slip flag is set, indicating that even the best wheel speed is not representative of vehicle velocity, the gain matrix may be decreased or even set to zero. This may cause the velocity estimation module 112 to use dead reckoning, which may base the velocity estimation on an integration of the compensated acceleration.

The best wheel selection module 128 may take into account a driving mode in selecting the best wheel. A driving mode determination module 136 determines the driving mode based on accelerator position and brake pressure. The driving mode determination module 136 may determine whether the driving mode is a traction mode (i.e., a mode in which vehicle speed is being maintained or increased) or a braking mode. In addition, the driving mode determination module 136 may receive inputs from other systems that may modify the driving mode of the vehicle, such as adaptive cruise control or traction control.

Figure 3B:
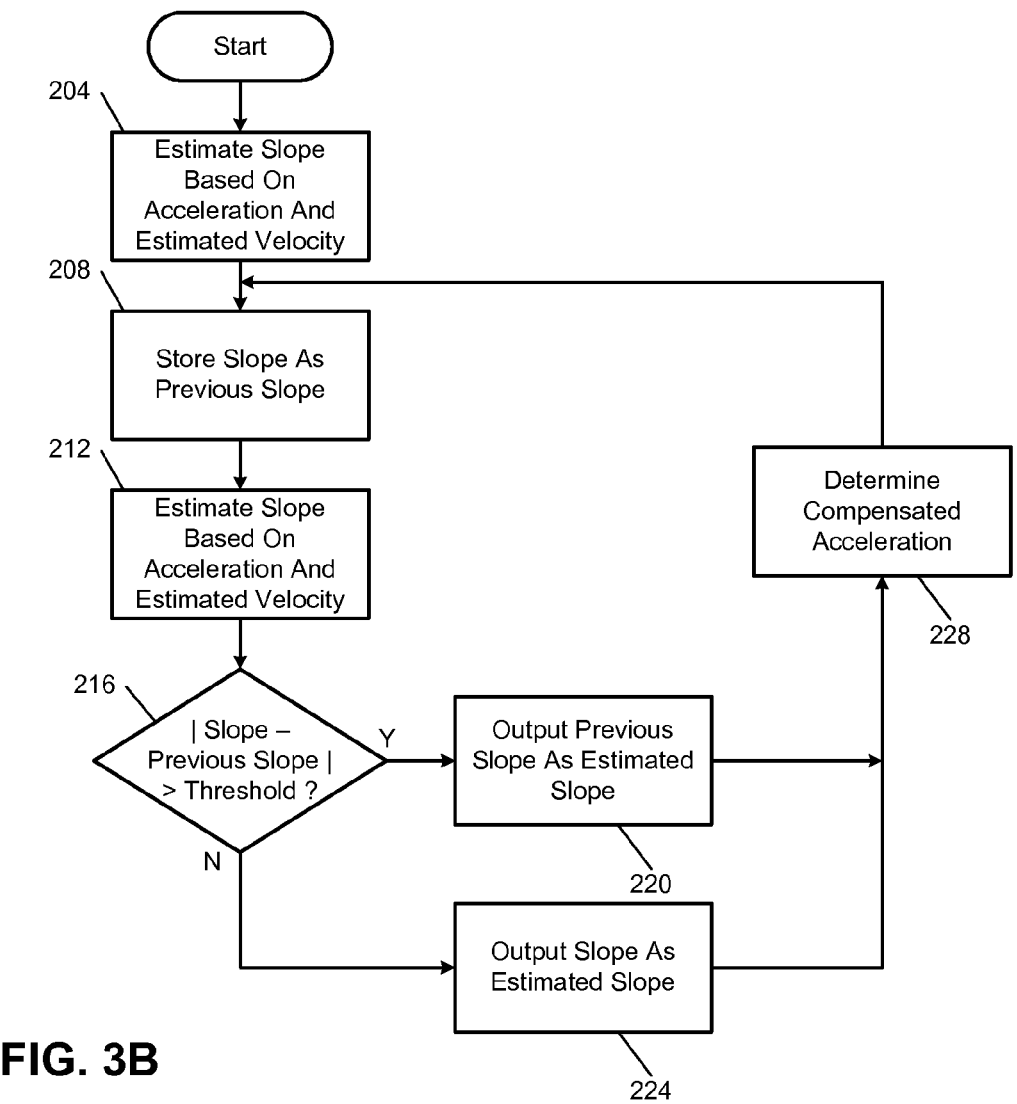
FIG. 3B is a flowchart showing example operation of slope estimation and acceleration compensation.

In FIG. 3B, example slope estimation and acceleration compensation is shown. Control begins at 204 where the slope of the vehicle is estimated based on acceleration and estimated velocity. Control continues at 208 where the present slope is stored as the previous slope. Control continues at 212 where the slope is estimated based on acceleration and estimated velocity.

Control continues at 216 where, if the absolute value of the difference between the present slope and the previous slope exceeds a threshold, control transfers to 220; otherwise, control transfers to 224. At 220, control outputs the previous slope as the estimated slope, and continues at 228. At 224, control outputs the present slope as the estimated slope, and continues at 228. At 228, control compensates the acceleration measurement to determine a compensated acceleration in the longitudinal direction of the vehicle. Control then returns to 208.

Figure 4:
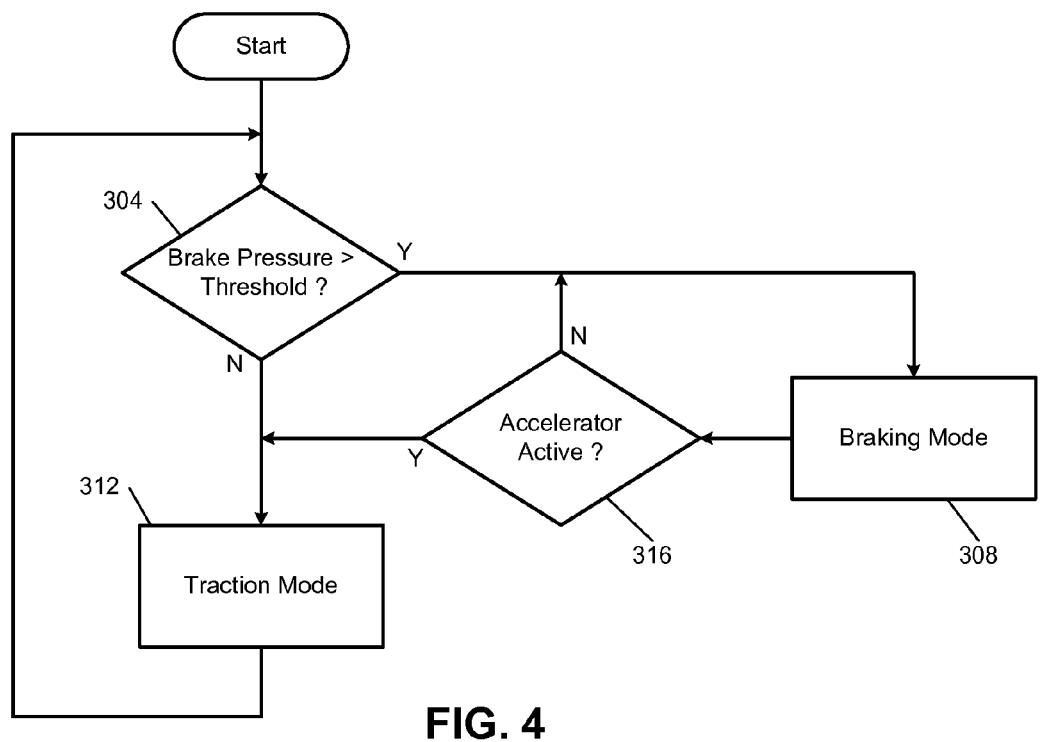
FIG. 4 is a flowchart showing example operation of driving mode determination.

In FIG. 4, example determination of driving mode is shown. Control begins at 304 where, if an applied brake pressure is greater than a threshold, control transfers to 308; otherwise, control transfers to 312. At 308, a braking mode is declared and output to interested processes or modules, such as the best wheel selection module 128 of FIG. 2. Control continues at 316 where, if the accelerator pedal is active (that is, being pressed by a driver), control transfers to 312; otherwise, control returns to 308. At 312, control declares that the vehicle is operating in traction mode, and returns to 304.

Figure 5:
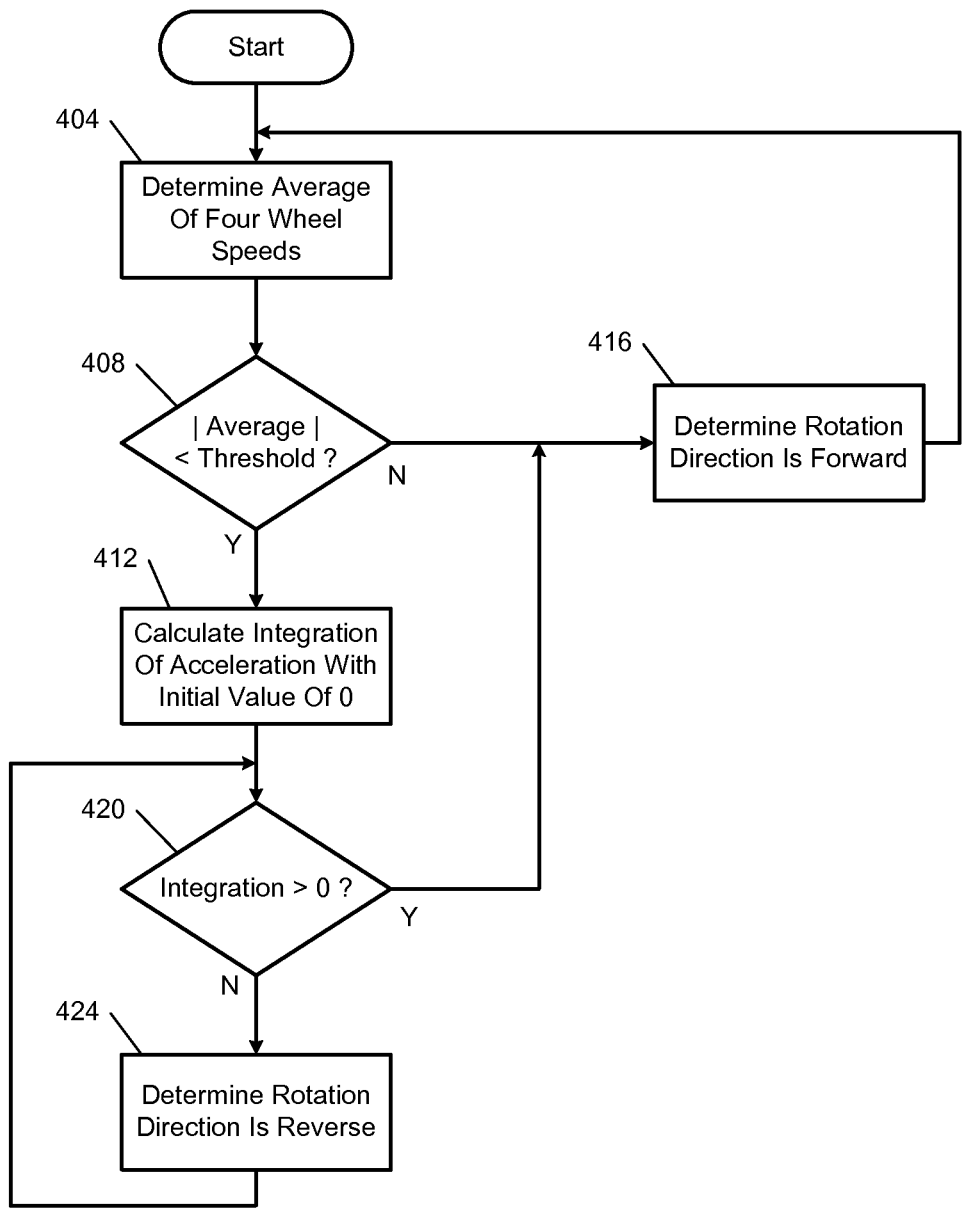
FIG. 5 is a flowchart showing example operation of wheel rotation direction determination.

In FIG. 5, example determination of wheel rotation direction is shown. Control begins at 404 where an average of the four wheel speeds is determined. Control continues at 408 where, if the absolute value of the average is less than a threshold, control transfers to 412; otherwise, control transfers to 416. At 416, control determines that the rotation direction of the wheels is forward (this may also be described as the wheel speed having a positive sign), and control returns to 404.

At 412, control calculates an integration of acceleration with an initial value of zero. Control then continues at 420 where, if the integration exceeds zero, control transfers to 416; otherwise, control transfers to 424. At 424, control determines that the rotation direction of the wheel is the reverse direction (this may also be described as the sign of the wheel speed being negative), control then returns to 420.

Figure 6:
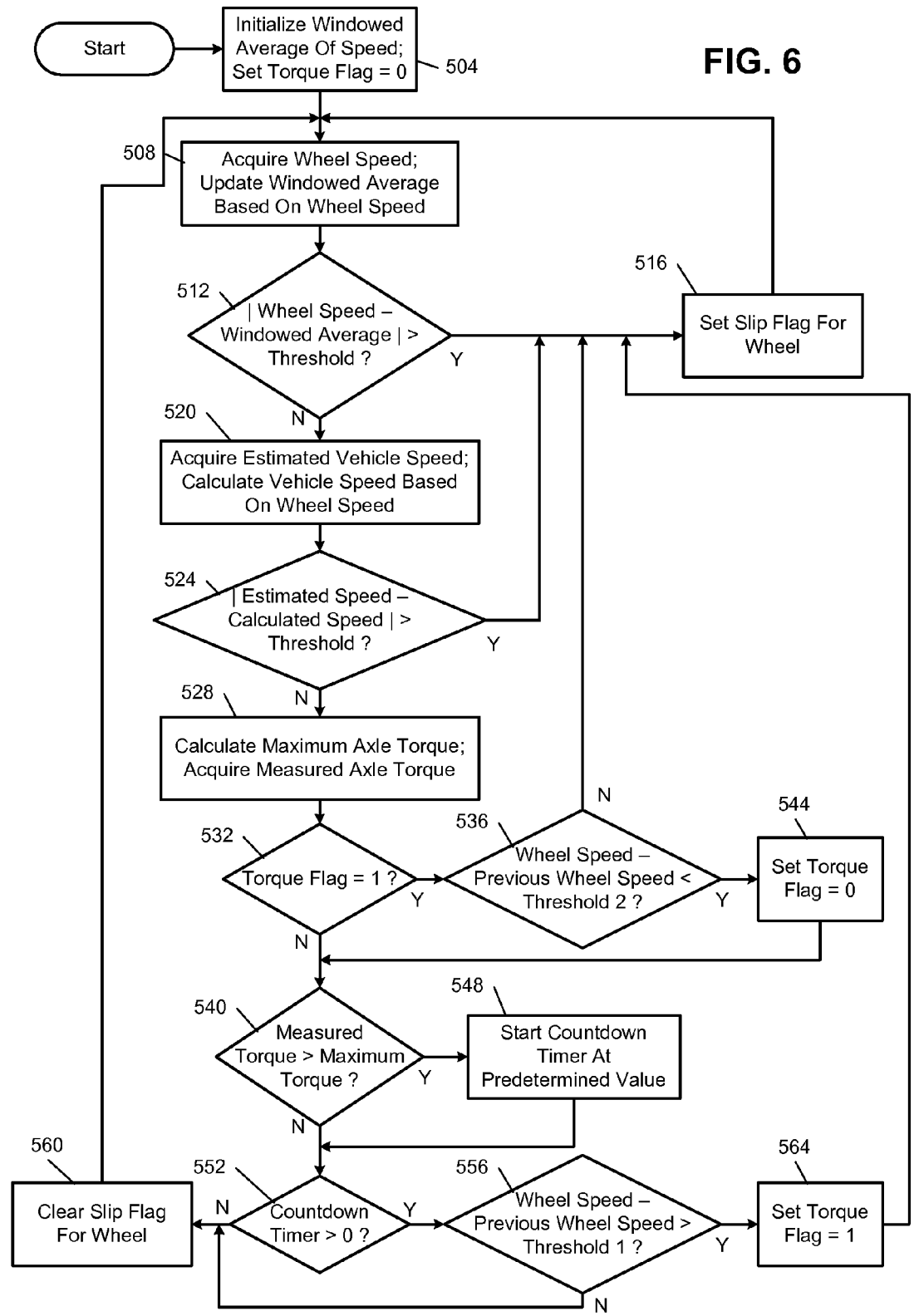
FIG. 6 is a flowchart showing example operation of slip determination for a given vehicle wheel.

In FIG. 6, example operation of wheel slip flag determination is shown. Control begins at 504 where a windowed average of wheel speeds is initialized. In addition, a torque flag is initialized to zero. The torque flag indicates whether a wheel slip condition as a result of excess torque is present. The torque flag is set based on certain conditions described below, and then is cleared based on other conditions.

The operation of FIG. 6 may be performed independently for each of the wheels of the vehicle. For example only, one iteration of the control described in FIG. 6 may be performed for each of the wheels in turn, and then another iteration of the control is performed for each of the wheels in turn. Alternatively, four independent instantiations of the control in FIG. 6 may be performed simultaneously or substantially simultaneously for all of the wheels.

At 508, wheel speed is acquired and the windowed average is updated based on the acquired wheel speed. The windowed average may be an exact windowed average where each of the previous wheel speeds in the windowed average is stored so that the oldest previous wheel speed can be removed in turn as each new acquired wheel speed is added. Alternatively, a running average may be performed where the newly acquired wheel speed is incorporated into the running average, but only the most recent value of the running average is maintained.

Control continues at 512 where, if an absolute value of the difference between the present wheel speed and the windowed average is greater than a threshold, control transfers to 516; otherwise, control continues at 520. This test may be expressed as follows:

$$\left| \omega(k) - \frac{1}{m}\sum_{i=k-m}^{k-1} \omega(i) \right| > \Delta\omega_{thrshld}$$

where the windowed average includes m samples of wheel speed $\omega$ and the threshold is $\Delta\omega_{thrsld}$.

A difference between the wheel speed and the windowed average being greater than the threshold indicates an abrupt change in wheel speed, which is indicative of slipping of the wheel as opposed to normal acceleration or deceleration of the vehicle. Therefore, at 516, the slip flag is set for the wheel, and control returns to 508.

At 520, control acquires the estimated vehicle speed and calculates a vehicle speed based on the present wheel speed. Control continues at 524 where, if the absolute value of the difference between the estimated speed and the calculated speed is greater than a threshold, control transfers to 516; otherwise, control continues at 528. Unless otherwise specified, thresholds used in the control of the present disclosure are not necessarily the same value. For example, the threshold of 524 may be different than the threshold of 512. The test of 524 may be expressed as follows:

$$|\omega(k)R_r - \hat{v}_x^-(k)| > \Delta v_{thrshld}$$

where the tire radius is $R_r$, the pre-estimation of the vehicle velocity is $\hat{v}_x^-$, and the threshold is $\Delta v_{thrsld}$.

At 528, control calculates a maximum axle torque that can be applied to the road without expecting that wheel slip will be produced. Control also acquires a measured axle torque. In various implementations, the measured axle torque may be easily and accurately measured when the axle torque is being generated by an electric motor. When the axle torque is being generated by an internal combustion engine, the measured torque may be indirect and may require less sensitive thresholds owing to the resulting imprecision of the measured torque.

When the axle torque from the motor is greater than the maximum torque possible due to the road friction, the wheel will slip. Using the rear axle as example, the normal force on the axle is:

$$F_{zr} = \frac{m(l_f g + h a_x)}{l_f + l_r}$$

where $F_{zr}$ is the normal force on the rear axle, m is the total mass of the vehicle, $a_x$ is the acceleration from the vehicle center of gravity (CG), $l_f$ and $l_r$ are, respectively, the distance between the CG and front and rear axle, h is the height (to the earth) of the CG, and g is the gravity acceleration.

At the time that all wheels are spinning, the maximum of road friction ($\mu_{max}$) can be assumed to be:

$$\mu_{max} = \frac{\hat{v}_x}{g}$$

Then, the maximum axle torque is:

$$T_{rmax} = \mu_{max} F_{zr} R_r$$

where $R_r$ is the wheel radius. When the measured rear axle torque $T_r$ is greater than $T_{rmax}$, the wheel passes the peak friction and the wheel is expected to slip.

Control continues at 532 where, if the torque flag is set (e.g., equal to one), control transfers to 536; otherwise, control transfers to 540. At 536, a wheel slip condition attributed to excess torque has been determined, and a condition is tested to determine whether the wheel slip due to excess torque has ended. Therefore, if the wheel speed minus a previous value of wheel speed is less than a second threshold, control transfers to 544; otherwise, the slip state is still present and control transfers to 516. The previous wheel speed may be the immediately prior measurement of wheel speed or may be a wheel speed from a certain number of samples (or length of time) prior to the present measurement of wheel speed. This condition may be expressed as:

$$\omega(k) - \omega(k-m) < \Delta \omega_2$$

where $\omega(k)$ and $\omega(k-m)$ are, respectively, the wheel speed measurements at discrete time-step k and the discrete time-step m time-steps prior to k, and where $\Delta \omega_2$ is the second threshold (which may be referred to as the torque slip reset threshold value).

At 544, the present wheel speed has decreased from the previous wheel speed by more than the threshold, and therefore the slip event is determined to be over and the torque flag is set to zero. Control then continues at 540. At 540, control determines whether the measured axle torque is greater than the calculated maximum axle torque. If so, control transfers to 548; otherwise, control transfers to 552.

At 548, a timer is started at a predetermined value, and the timer counts down to zero from that predetermined value. This timer allows increases in wheel speed that occur within the predetermined value of time subsequent to an excess torque condition to be determined as wheel slip. Control then continues at 552.

At 552, if the countdown timer is greater than zero, control transfers to 556; otherwise, control transfers to 560. At 556, the countdown timer is greater than zero, meaning that an excess torque condition has recently occurred. Therefore, if the present wheel speed minus a previous wheel speed is greater than a first threshold, this is taken as an indication that wheel slip has been caused by excess torque and control transfers to 554; otherwise, control transfers to 560. This condition can be expressed as $$\omega(k) - \omega(k-m) > \Delta \omega_1$$

where $\omega(k)$ and $\omega(k-m)$ are, respectively, the wheel speed measurements at discrete time-step k and the discrete time-step m time-steps prior to k, and where $\Delta \omega_1$ is the first threshold (which may be referred to as the torque slip start threshold value).

At 564, the torque flag is set to equal to one and control transfers to 516, where the slip flag is set for the wheel. At 560, none of the three prior conditions indicating wheel slip have been satisfied and, therefore, the slip flag for the wheel is cleared. Control then returns to 508. In various implementations, the three tests shown in FIG. 6 may be implemented separately and/or asynchronously to each other. Still further, each of the tests may be performed with a different periodicity, which may depend on how frequently associated measurements are performed.

Figure 7:
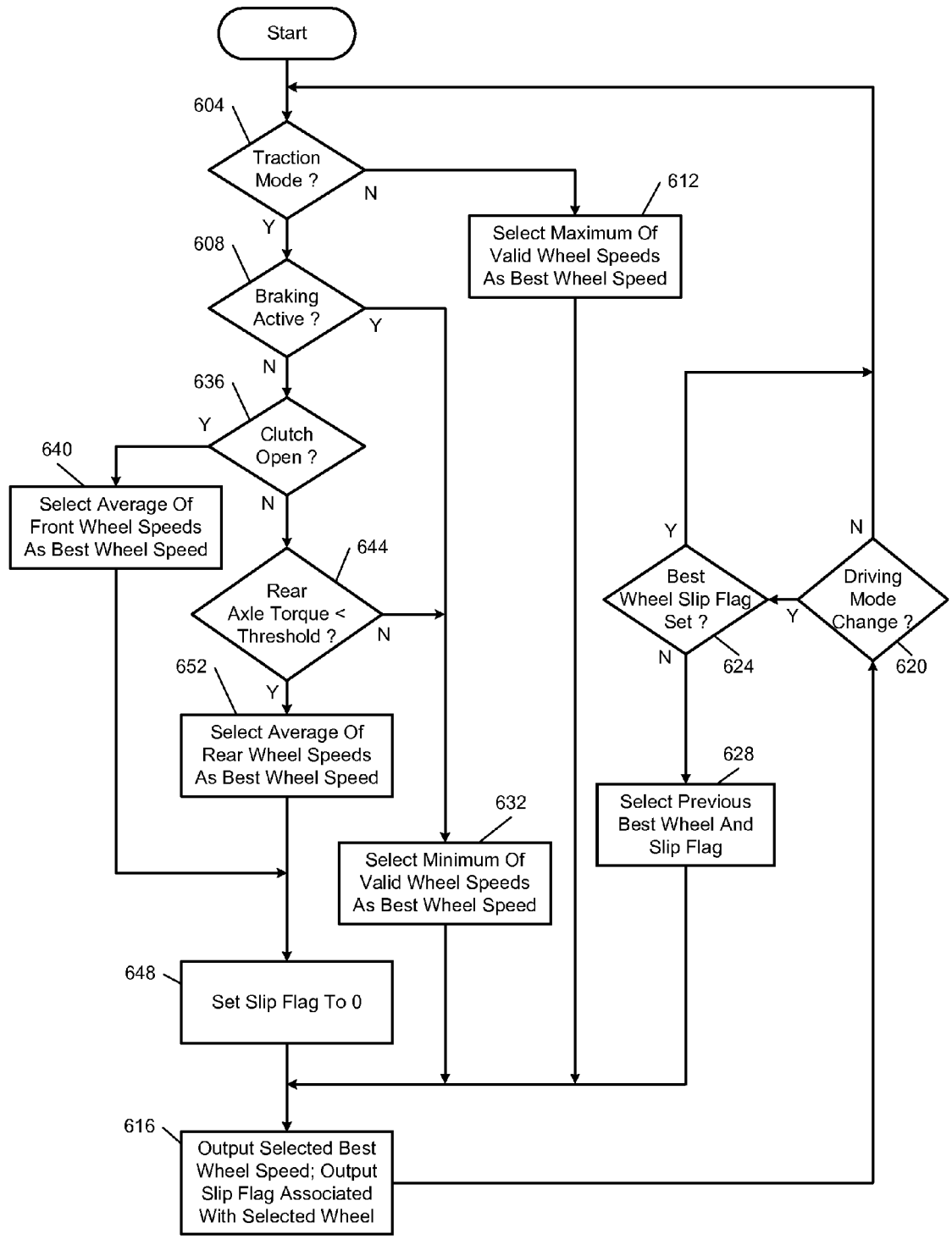
FIG. 7 is a flowchart showing example operation of best wheel selection for use in vehicle velocity estimation.

In FIG. 7, an example operation of best wheel selection is shown. Control begins at 604 where, if the vehicle is operating in traction mode, control transfers to 608; otherwise, control transfers to 612. At 612, control is not in traction mode, and is therefore in braking mode. In braking mode, slipping wheels will tend to have a lower wheel speed than non-slipping wheels. As a result, the valid wheel having the maximum speed is chosen as the best wheel speed. The valid wheels include the wheels whose slip flag is not set. However, if the slip flag is set for all of the wheels, then all of the wheels are considered for selection. Control then continues at 616 where the selected wheel speed is output. In addition, the slip flag associated with the selected wheel is output.

Control continues at 620 where, if a driving mode change has occurred, control transfers to 624; otherwise, control returns to 604. If the driving mode has changed from traction mode to braking mode, or vice versa, the previously selected best wheel may still be the best wheel. Switching from the wheel having the maximum wheel speed to the wheel having the minimum wheel speed across this transition may lead to control instability. At 624, if the best wheel slip flag is not set, control transfers to 628 where the previously selected best wheel is selected once again, and control continues at 616. Otherwise, if at 624 the slip flag for the selected best wheel is set, control returns to 604 where the best wheel is reevaluated.

At 608, control determines whether braking is active. If so, control transfers to 632; otherwise, control transfers to 636. At 632, the wheel having the minimum wheel speed is selected as the best wheel, and control transfers to 616. At 636, if the clutch is open (for example, when the internal combustion engine is not drivingly coupled to the front wheels), control transfers to 640; otherwise, control transfers to 644. Although the example control of FIG. 7 describes the front wheels as being driven by an internal combustion engine and the rear wheels as being driven by an electric motor, these roles may be reversed, Further, as described above, an electric motor or motors may be used to drive both the front and rear wheels.

At 640, braking is not being applied to the wheels, and torque is not being applied to the front wheels; therefore, one of the front wheels may be selected as the best wheel. The best wheel may be chosen as an aggregate of the two front wheels and the best wheel speed may be determined by averaging the speeds of the front wheels. This may reduce the influence of lateral movement (yaw) and measurement noise. Control then continues at 648 where the slip flag for the aggregate wheel is set to zero. Control then continues at 616.

Returning to 644, if the rear axle torque is less than a threshold, control transfers to 652; otherwise, control transfers to 632. At 652, little or no torque is being applied to the rear wheels, and therefore the speeds of the rear wheels are candidates for the best wheel speed. Similarly to 640, the best wheel speed may be determined by averaging the speeds of the two rear wheels. Control then continues at 648.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A OR B OR C), using a non-exclusive logical OR, and should not be construed to mean "at least one of A, at least one of B, and at least one of C." It should be understood that one or more steps within a method may be executed in different order (or concurrently) without altering the principles of the present disclosure.

In this application, including the definitions below, the term 'module' or the term 'controller' may be replaced with the term 'circuit.' The term 'module' may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium include nonvolatile memory circuits (such as a flash memory circuit or a mask read-only memory circuit), volatile memory circuits (such as a static random access memory circuit and a dynamic random access memory circuit), and secondary storage, such as magnetic storage (such as magnetic tape or hard disk drive) and optical storage.

The apparatuses and methods described in this application may be partially or fully implemented by a special purpose computer created by configuring a general purpose computer to execute one or more particular functions embodied in computer programs. The computer programs include processor-executable instructions that are stored on at least one non-transitory, tangible computer-readable medium. The computer programs may also include or rely on stored data. The computer programs may include a basic input/output system (BIOS) that interacts with hardware of the special purpose computer, device drivers that interact with particular devices of the special purpose computer, one or more operating systems, user applications, background services and applications, etc.

The computer programs may include: (i) assembly code; (ii) object code generated from source code by a compiler; (iii) source code for execution by an interpreter; (iv) source code for compilation and execution by a just-in-time compiler, (v) descriptive text for parsing, such as HTML (hypertext markup language) or XML (extensible markup language), etc. As examples only, source code may be written in C, C++, C#, Objective-C, Haskell, Go, SQL, Lisp, Java®, ASP, Perl, Javascript®, HTML5, Ada, ASP (active server pages), Perl, Scala, Erlang, Ruby, Flash®, Visual Basic®, Lua, or Python®.

None of the elements recited in the claims is intended to be a means-plus-function element within the meaning of 35 U.S.C. §112(f) unless an element is expressly recited using the phrase "means for", or in the case of a method claim using the phrases "operation for" or "step for".

What is claimed is:

1. A method for controlling an electric drive system of a vehicle having a plurality of wheels, wherein the electric drive system drives an electric motor for driving at least a pair of a plurality of wheels of the vehicle the method comprising:
   determining a rotational direction of one of the plurality of wheels of the vehicle,
   using an electronic controller in communication with the electric drive system to perform a plurality of operations including:
   a) determining an average wheel speed of the plurality of wheels;
   b) in response to an absolute value of the average wheel speed being greater than a first threshold, determining that the rotational direction of the wheel is in a first rotational direction;
   c) in response to the absolute value of the average wheel speed not being greater than the first threshold:
      i) determining an integration of acceleration;
      ii) in response to the value of the integration being greater than zero, determining that the rotational direction of the wheel is in the first rotational direction; and
      iii) in response to the value of the integration not being greater than zero, determining that the rotational direction of the wheel is in a second rotational direction that is opposite the first rotational direction; and
   d) using the electric drive system to control at least one of the plurality of wheels of the vehicle based on the determined rotational direction of the wheel.

2. A method for controlling an electric drive system of a vehicle having a plurality of wheels, wherein the electric drive system drives an electric motor for driving at least a pair of a plurality of wheels of the vehicle, the method comprising:
   using an electronic controller to perform a plurality of operations including:
   determining slippage of a wheel, the wheel being one of the plurality of wheels of the vehicle;
   determining a current value of a speed of the wheel based on a sensor that produces a signal in response to rotation of the wheel;
   determining a windowed average of the wheel speed based in part on the current value of the determined speed of the wheel;
   in response to an absolute value of a difference between the current value of the determined wheel speed and the windowed average of the wheel speed being greater than a first predetermined threshold, setting a wheel slip condition of the wheel to a first condition;
   in response to the absolute value of the difference between the current value of the determined wheel speed and the windowed average of the wheel speed not being greater than the first predetermined threshold:
      i) acquiring an estimate of a speed of the vehicle;
      ii) calculating a speed of the vehicle based solely on the current value of the determined wheel speed;
      iii) in response to an absolute value of a difference between the estimate of the speed of the vehicle and the calculated speed of the vehicle being greater than a second predetermined threshold, setting the wheel slip condition of the wheel to the first condition;
      iv) in response to the absolute value of the difference between the estimate of the speed of the vehicle and the calculated speed of the vehicle not being greater than the second predetermined threshold:
         a) calculating a maximum axle torque;
         b) acquiring a measured axle torque; and
         c) in response to the measured axle torque being greater than the maximum axle torque, setting the wheel slip condition to the first condition and initiating a countdown timer at a predetermined value; and
         d) in response to the measured axle torque not being greater than the maximum axle torque:
            1) in response to a value of the countdown timer being greater than zero and a difference between the current value of the determined wheel speed and a previous value of the determined wheel speed being greater than a third predetermined threshold, setting the wheel slip condition to or maintaining the wheel slip condition at the first condition;
            2) in response to the value of the countdown timer not being greater than zero or the difference between the current value of the determined wheel speed and the previous value of the determined wheel speed not being greater than the third predetermined threshold, setting the wheel slip condition to or maintaining the wheel slip condition at a second condition; and
   using the electronic controller to control at least one of the plurality of wheels of the vehicle based on the wheel slip condition.

3. The method of claim 2, wherein the first condition of the wheel slip condition is a slipping condition and the second condition of the wheel slip condition is a non-slipping condition.

4. A method for controlling an electric drive system of a vehicle having a plurality of wheels, wherein the electric drive system drives an electric motor for driving at least a pair of a plurality of wheels of the vehicle, the method comprising:
   determining a wheel speed of a best wheel of the vehicle, wherein the plurality of wheels of the vehicle includes a pair of front wheels and a pair of rear wheels, the pair of front vehicle wheels being driven by a first powertrain, the pair of rear wheels being selectively driven by a second powertrain;
   A) determining a current value of speed of each of the plurality of vehicle wheels based on a plurality of sensors, each sensor producing a signal in response to rotation of a respective one of the plurality of vehicle wheels;
   B) determining a wheel slip condition of each of the plurality of vehicle wheels;
   C) determining if the second powertrain is being operated in a traction mode in which rotary power is transmitted to the pair of rear wheels;

D) in response to determining that the second powertrain is not being operated in a traction mode, setting the wheel speed of the best wheel at a maximum value of the current value of speed from amongst the plurality of vehicle wheels having a non-slipping wheel slip condition;

E) in response to determining that the second powertrain is being operated in a traction mode:
  i) determining whether the plurality of vehicle wheels are being actively braked;
  ii) in response to determining that the plurality of vehicle wheels are being actively braked, setting the wheel speed of the best wheel at a minimum wheel value of the current value of speed from amongst the plurality of vehicle wheels having a non-slipping wheel condition; and
  iii) in response to determining that the plurality of vehicle wheels are not being actively braked:
    a) determining whether the first driveline is disconnected from the pair of front wheels;
    b) in response to determining that the first driveline is drivingly disconnected from the pair of front wheels, setting the wheel speed of the best wheel at an average of the wheel speeds of the pair of front wheels; and
    c) in response to determining that the first driveline is not drivingly disconnected from the pair of front wheels, determining if the torque on the pair of rear wheels is less than a predetermined threshold;
      1) in response to determining if the torque on the pair of rear wheels is not less than the predetermined threshold, setting the wheel speed of the best wheel at the minimum wheel value of the current value of speed from amongst the plurality of vehicle wheels having the non-slipping wheel condition; and
      2) in response to determining if the torque on the pair of rear wheels is less than the predetermined threshold, setting the wheel speed of the best wheel at an average of the wheel speeds of the pair of rear wheels; and F) controlling at least one of the plurality of wheels of the vehicle based on the wheel speed of the best wheel.

* * * * *

UNITED STATES PATENT AND TRADEMARK OFFICE
CERTIFICATE OF CORRECTION

| | | |
|---|---|---|
| PATENT NO. | : 9,637,001 B2 | Page 1 of 1 |
| APPLICATION NO. | : 14/924745 | |
| DATED | : May 2, 2017 | |
| INVENTOR(S) | : Gao et al. | |

It is certified that error appears in the above-identified patent and that said Letters Patent is hereby corrected as shown below:

In the Specification

In Line 35 of Column 5, after "$H_k$", insert --is--, therefor.

In Line 5 of Column 7, delete "$v_y v_x \cos \beta$", and insert --$v_y = v_x \cos \beta$--, therefor.

Signed and Sealed this
Twenty-seventh Day of June, 2017

Joseph Matal
*Performing the Functions and Duties of the*
*Under Secretary of Commerce for Intellectual Property and*
*Director of the United States Patent and Trademark Office*